ntials Patent Office 3,368,092
Patented Feb. 6, 1968

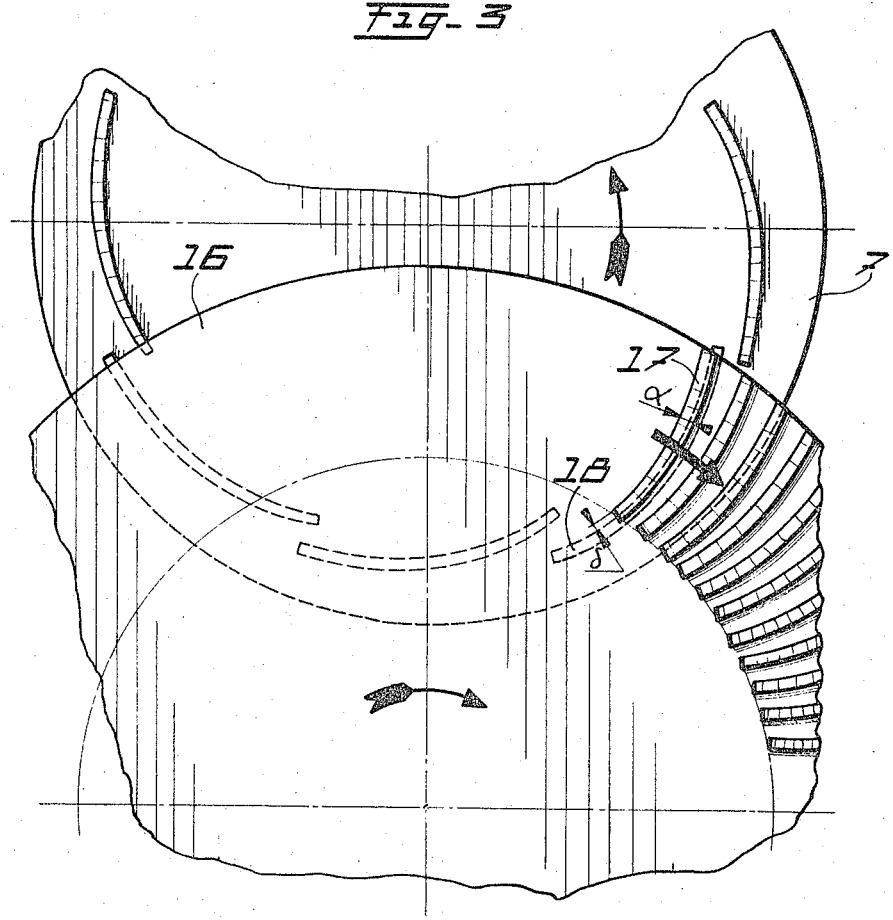

3,368,092
MAGNETIC POWER TRANSMISSION DEVICE
Michel Cotton De Bennetot, Brest, France, assignor to Corporation Societe d'Etudes et de Recherches Magnetiques Sermag, a limited company
Filed June 12, 1964, Ser. No. 374,612
Claims priority, application France, June 13, 1963, 938,004, Patent 1,371,831
14 Claims. (Cl. 310—99)

ABSTRACT OF THE DISCLOSURE

Disclosed herein is a magnetic power transmission device for increasing or decreasing speed of the driven element relative to the driving element. Both elements face each other in a peripheral area with magnetic projections arranged to substantially coincide in a working zone which is substantially offset from the line of centers of the driving and driven elements. The magnetic projections on the driven element are radially disposed, while those on the driving element are disposed at an angle relative to the radius. The speed change ratio is independent of the ratio of any diameter of the elements, but depends upon the ratio of the number of magnetic projections on the respective elements.

---

This invention relates to a transmission device equivalent to a gearing wherein the conventional teeth are replaced by members which mutually attract each other through magnetic strength and transmit the drive without any meshing action or mechanical engagement of any kind.

According to a preferred embodiment of this invention, the two gear elements (pinion and gear) are mutually coupled through the magnetic attractive force produced by magnetic members facing each other on the respective flat surfaces of the pinion and gear, normal to the shafts of the gear.

According to a particular constructional form, said magnetic members consist of hypocycloidal or epicycloidal projections sufficiently short to have a substantially constant curvature, the magnetic projections which are located on the driven gear element being substantially radial, whereas the magnetic projections which are located on the driving gear element are inclined with respect to the radial directions.

In order to make this invention more understandable and to be readily carried into effect, reference may now be had to the accompanying drawings illustrating the same by way of example, and in which:

FIG. 1 is a top plan view of a speed reducer consisting of a magnetic gearing according to the invention, of which

FIG. 3 illustrates the way in which the magnetic members of the two elements of the gearing are co-operating.

Figure 1:
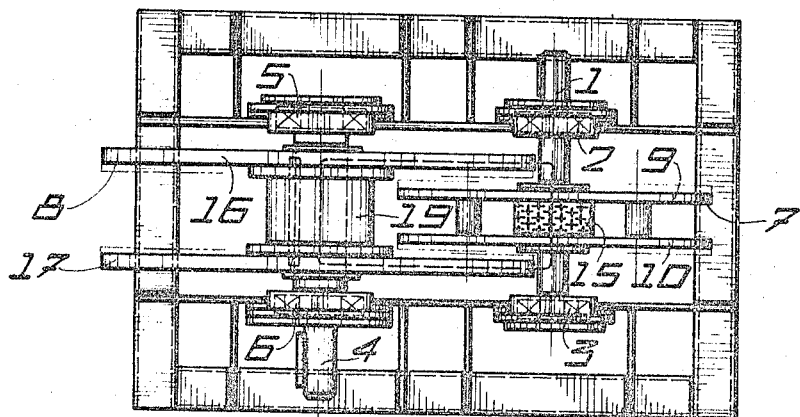

The speed reducer shown in FIG. 1 essentially comprises an input shaft on bearings 2 and 3, an output shaft 4 supported by bearings 5 and 6, and gear elements 7 and 8, integral with the shafts 1 and 4 respectively.

The driving pinion 7 essentially consists of two disks 9 and 10 of a soft magnetic material united by non-magnetic cross-pieces 11, 12, 13, 14 and by a permanent magnet 15.

The driven gear 8 comprises two disks of a soft magnetic material 16 and 17 united by a cross member 19, also made of a soft magnetic material.

FIG. 3 illustrates, on a larger scale, the two facing surfaces of disks 7 and 16, for instance. The arrows indicate the direction of rotation of these disks.

One will notice that each of the disks 9 and 10 of the driving pinion 7 is provided, on the face opposite the corresponding disk of the driven gear, with projecting members like 18, the general direction of which is inclined with respect to a radial direction. The projections 20 on each disk 16 and 17 of the driven gear, however, are substantially radial.

The projections such as 18 and 20 are of a soft magnetic material. In the embodiment shown in the drawing, wherein the gearing is of the external type, these parts are substantially shaped as portions of an epicycloid.

In a modification which is equivalent to an internal gear and pinion the projecting parts will substantially be shaped as portions of a hypocycloid.

The magnetic flux generated by magnet 15 closes, following the general direction indicated in FIG. 1 in dotted lines. There thus exists a magnetic attractive force between the opposite surfaces of the elements 18 and 20, for instance.

It can be shown that owing to the fact that projection 18 is set off with respect to the projection 20, at a distance $\delta$ which is smaller than the width $\alpha$ of the projection 20 at the moment when the two projections are substantially facing each other, the attractive force has a component directed as indicated in FIG. 3 by the double arrow. It is this component which generates the rotation of the driven gear.

It is remarked that contrary to what happens in priorly known magnetic couplings, the respective projections on the driving gear element successively face and run along the successive projections on the driven gear element, this mode of operation just being equivalent to the meshing of the teeth of a conventional gearing. In priorly known magnetic couplings, however, the corresponding magnetic members are constantly facing each other and are not separated one from the other.

The speed ratio of the gearing schematically illustrated in FIG. 3 is equal, of course, to the ratio of the number of projecting parts on the driven and on the driving gear elements.

However, it is to be emphasised that, contrary to what happens with a conventional gearing, the speed ratio may be quite different from the ratio of the diameters of the two gear elements. It is possible to obtain a high speed reduction ratio, up to several tens, for instance, without conferring to the gear elements prohibitive diameters.

In the example illustrated the driven gear comprises eighty projecting parts, with eight for the pinion, which gives a reduction of ten.

Figure 2:
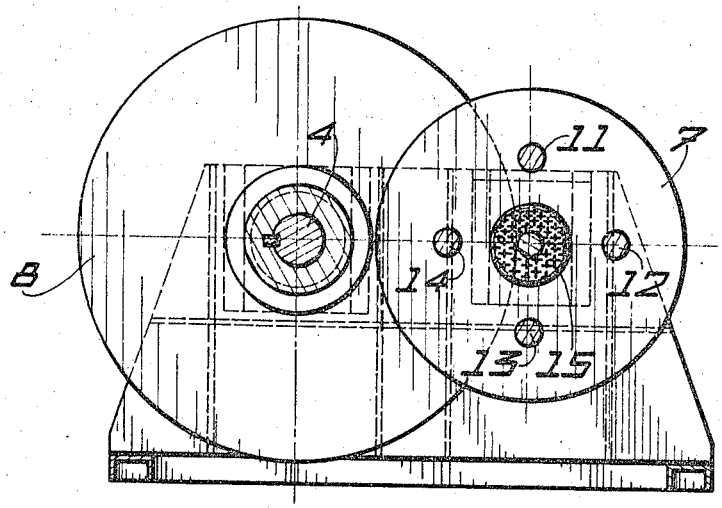
FIG. 2 is a sectional view.

There also may be realised repetitive arrangements, assembling in series a plurality of elements of the type as illustrated in FIGS. 1 and 2, in such a way that the corresponding shafts interlock. The driving force of these structures will be multiplied by the number of elements of the series.

According to yet another feature of this invention the facing surface portions of the projecting members will have to be substantially constant during the rotation of the gear element. In this way the loss of energy due to hysteresis of the permanent magnet is eliminated up to a maximum resulting, on the one hand, in avoiding the heating of the magnetic pieces and, consequently, in obtaining an efficiency substantially equal to 100%, while, on the other hand, the gear elements are driven with a substantially constant force.

It will be noted that in the gearing according to the invention the main cause of vibration, that is the shocks due to the mechanical contact between the projecting parts which have taken the place of the conventional teeth, is eliminated. This feature is particularly important in a reducer destined for transmission of power from high speed turbines to low speed shafts, for instance the propeller shafts on ships.

This gearing will operate without any lubrication except for the bearings of the shafts.

Moreover, the permitted lack of concentricity of the two gear elements is several times higher than the one which can be tolerated with a conventional gearing and, due to the face that a gearing according to the invention is not provided with teeth, there is no expensive high-precision machining operation in its manufacture.

Although in this specification account has been taken more particularly of a speed reducer, it goes without saying that the gearing may also be used as a speed increaser or as any other type of power transmission.

What I claim is:

1. A power transmission device essentially consisting of at least two gear elements having substantially parallel rotation axes and including driving and driven gear elements having facing plane surface portions; a plurality of magnetic projections shaped as substantially constant curvature portions of a substantially cycloidal curve being arranged on said facing plane surface portions and defining air-gaps therebetween, the respective facing projections of the two gear elements being set off one with respect to the other in a working zone which is substantially offset from an imaginary line extending between said axes, said magnetic projections on said driven element being radially disposed and said magnetic projections on the driving element being substantially inclined relative to the radial direction of the driving elements, and means co-operating with said magnetic projections for generating in said air-gaps a unidirection magnetic field substantially parallel to said rotation axes, whereby the respective magnetic members on the driving gear element successively face and run alongside the successive magnetic projections on the driven gear element in said working zone.

2. The combination of a first gear element and a further gear element for use in a magnetic power transmission device, comprising:
said first gear element including at least a first plate having an axis and a plurality of magnetic members associated with said plate and extending in a direction inclined to the radial direction to said axis,
said further gear element including a further plate having an axis which is substantially parallel to the first mentioned axis and a plurality of magnetic members which extend on said further plate in a direction substantially parallel to the radial direction from said second mentioned axis,
said magnetic members of said first gear element co-operating with the magnetic members of the said further gear element to facilitate the transmission of force from said first gear element to said further gear element,
said plurality of first-mentioned magnetic members being arranged in a substantially circular pattern on said first mentioned gear element, each of said first-mentioned magnetic members being a strip having one end in radial juxtaposition to the other end of the strip succeeding it; and where at least one of a plurality of said magnetic members are circularly arranged on said further plate, said one member on said further plate being in axial juxtaposition to at least one of said first mentioned magnetic members to define an air-gap therebetween so that said one magnetic member on said further plate is in magnetic circuit with said one magnetic member on said first-mentioned plate, said magnetic circuit being produced as soon as the magnetic member preceding said one magnetic member on said further plate is removed from magnetic circuit and being maintained until the magnetic member succeeding said one magnetic member on said further plate is placed in magnetic circuit.

3. In a power transmission device of the type having:
a rotary driving element and a rotary driven element having substantially parallel rotation axes and respective plane surfaces successive portions of each of which face the other as each rotates,
a plurality of soft magnetic members disposed on each of said plane surfaces in said successive portions thereof and defining air gaps therebetween, and
means cooperating with said magnetic members for generating across a working zone, comprised of a facing pair of said magnetic members respectively on the driving and driven elements and the air gap therebetween, a unidirectional magnetic field to effect an attraction force between said magnetic members on the respective elements in said working zone to cause rotation of the driven element when the driving element is rotated,
the improvement comprising:
said magnetic members on the said driven element being substantially radial and said magnetic members on the driving element being substantially inclined with respect to the respective radial directions to cause said working zone to be substantially offset from an imaginary line extending between said rotation axes and to cause the respective magnetic members on the driving element, when rotated, to successively face and lengthwise run overlappingly but laterally offset along the successive magnetic members on the driven element for effecting between said elements a speed ratio which is independent of the diameters of said elements but dependent upon the ratio of the number of magnetic members on the respective elements.

4. A power transmission device as in claim 3 wherein the said magnetic members on the driving element are substantially tangential and are substantially longer than the said magnetic members on the driven element.

5. A power transmission device as in claim 3 wherein the magnetic members on each of said elements are magnetic projections.

6. A power transmission device as in claim 3 wherein the said magnetic members are shaped as substantially constant curvature portions of a substantially cycloidal curve.

7. A power transmission device as in claim 6 wherein said magnetic members are substantially shaped as portions of an epicycloid.

8. A power transmission device as in claim 6 wherein said magnetic members are substantially shaped as portions of a hypocycloid.

9. A power transmission device comprising:
a rotary driving element of soft magnetic material having an axis of rotation and a plane surface from which projects a plurality of first spaced soft magnetic members arranged successively in a substantially circular pattern adjacent the outer edge of said plane surface,
a rotary driven element of soft magnetic material having a rotation axis laterally spaced from and substantially parallel to the said axis of the driving element and having, facing the said plane surface of the driving element, a plane surface from which projects a plurality of second spaced soft magnetic members defining air gaps relative to the said first magnetic members on said driving element, and being arranged in a substantially circular pattern adjacent the outer edge of the said plane surface of the driven element, and
means cooperating with said driving and driven elements for generating across a working zone, comprised of a pair of said first and second magnetic members facing each other and the air gap therebetween, a unidirectional magnetic field to effect an attraction force between the first and second magnetic members in said working zone and cause rotation of the driven element when the driving element is rotated, said second magnetic member on the driven element being substantially radial and said first magnetic members on the driving element being substantially inclined with respect to the respective radial direction of the driving element to cause said working zone to be substantially offset from an imaginary line extending between said rotation axes and to cause the respective first magnetic members to successively face, and lengthwise run overlappingly but laterally offset along, the successive second magnetic members in said working zone when the said driving element is rotated, for effecting between said driven and driving elements a speed ratio which is independent of the diameters of said elements but dependent upon the ratio of the number of said first and second magnetic members.

10. A power transmission device as in claim 9 wherein the speed ratio between said elements is substantially higher than the diameter ratio thereof, and said first magnetic members are substantially tangential and substantially longer than said second magnetic members.

11. A power transmission device as in claim 9 wherein said first and second magnetic members are shaped as substantially constant curvature portions of a substantially cycloidal curve.

12. A power transmission device as in claim 11 wherein said magnetic members are substantially shaped as portions of an epicycloid.

13. A power transmission device as in claim 11 wherein said magnetic members are substantially shaped portions of a hypocycloid.

14. A power transmission device a in claim 9 wherein the respective shapes of said first and second magnetic members, in conjunction with the amount of said working zone offset and the amount of the said inclination of said first magnetic members, are such as to cause each first member to face and run along a said second magnetic member for the longest possible time during rotation of the said elements.

References Cited
UNITED STATES PATENTS

| | | | |
|---|---|---|---|
| 1,084,148 | 1/1914 | Huguenin | 310—103 |
| 2,096,906 | 10/1937 | Lilja | 310—103 X |
| 2,490,789 | 12/1949 | Ellis | 310—106 X |
| 2,606,222 | 8/1952 | Clifford et al. | 310—21 |
| 2,722,617 | 11/1955 | Cluwen | 310—103 |

DAVID X. SLINEY, *Primary Examiner.*